United States Patent Office 2,953,549
Patented Sept. 20, 1960

2,953,549

PREPARATION AND RECOVERY OF MODIFIED RUBBERY COPOLYMERS

Merlan Meredith Lambert, Baton Rouge, La., Marnell Albin Segura, Elizabeth, N.J., and Edward Allen Hunter, Baton Rouge, La., assignors to Esso Research and Engineering Company, a corporation of Delaware No Drawing. Filed Feb. 1, 1957, Ser. No. 637,641

11 Claims. (Cl. 260—85.3)

This invention relates to processing a butyl rubber modified with a nitroso compound which has at least one functional substitutent other than the nitroso group. More particularly it concerns the purification of butyl rubber which has been modified with a nitroso aromatic compound.

Butyl rubber is a copolymer comprising a major proportion of a monoolefin having 4 to 6 carbon atoms and a minor proportion of a multiolefin having 4 to 14 carbon atoms made by polymerizing these two types of monomer at a temperature between about −40° and −270° F. in the presence of alkyl halide solution of a Friedel-Crafts type catalyst. The most frequently used monoolefin is isobutylene and among the most commonly used conjugated diolefins are those having 4 to 6 carbon atoms, such as isoprene, butadiene-1,3, piperylene, etc., isoprene being preferred. Generally, the polymer is composed of between about 0.5 and 5 wt. percent of a multiolefin and 95 to 99.5 wt. percent of an isoolefin. Butyl rubber is a low unsaturation polymer, e.g., iodine number between 0.5 and 50, having a Staudinger molecular weight between about 20,000 and 100,000. Its preparation and properties are set forth in U.S. Patent 2,356,128.

It is known that butyl rubber reacts with nitroso compounds to form a modified copolymer which is suitable for treating fabrics, such as tire cords, to increase its adhesion to butyl rubber, natural rubber, GR-S, etc. One method of modifying butyl rubber comprises reacting it with a nitroso compound in a liquid phase. A difficulty encountered in this method has been the inability to separate the unreacted nitroso compound from the modified polymer.

It has now been found that unreacted portions of the nitroso compounds used to modify butyl rubber can be separated by keeping the reaction time at a minimum and washing the product with a critical amount of water which is added to the polymer solution without agitation.

According to the present invention the butyl rubber is dissolved in an inert $C_6$ to $C_{12}$ hydrocarbon solvent, such as hexane, heptane, benzene, etc., to produce a solution containing about 15 to 25 weight percent butyl rubber. For example, 100 parts by weight of rubber may be dissolved in from about 300 parts to 600 parts of hydrocarbon solvent. The copolymer solution may be prepared in or charged into a reactor having a jacket with which its temperature can be regulated. The temperature of the copolymer solution is adjusted to between about 150 and 350° F., preferably between about 180 and 210° F. The nitroso compound is then added with stirring and the reaction is allowed to proceed for from about ½ hour up to about 4 hours depending on the temperature. Higher temperatures require less time. For instance, if the reaction is run at 210° F., then 1 hour is a sufficient time. The amount of nitroso compound reacted may be varied from as little as 0.1 phr. (part by weight per 100 parts by weight of rubber) to 5 phr. However, in most instances, it is preferred to use between about 1 and 3 phr. of nitroso compound.

While numerous nitroso compounds may be used to modify the rubber, the preferred modifying agents are hydroxy-substituted mononitroso aromatic compounds. They have the empirical formula HO—Ar—NO in which Ar is a simple or substituted aromatic ring. Specific examples of suitable compounds are para nitrosophenol, meta nitrosophenol, para nitrosocresol, para nitrosoethylphenol, nitrosoresorcinol, nitrosoxylenol, etc.

Upon completion of the reaction, the copolymer solution is washed three times with water at a temperature between 80 and 180° F. using a ratio of from 1 to less than 1.5 volumes of copolymer solution per volume of water, and preferably a ratio of about 1:1. If less water than this is used, the separating time will be increased about threefold and it will be necessary to wash the rubber solution more than three times. On the other hand, if more water is employed, it makes the separation much more difficult and prolonged. Furthermore, it has been found that not agitating the water-copolymer mixture until after the water has been added results in less emulsion formation, better separation and, therefore, a purer product. Generally, the water-copolymer mixture is agitated for from a few minutes up to about 1 hour, allowed to settle, and the wash water separated from the copolymer layer.

The resulting nitrosopolyfunctional aromatic-butyl rubber reaction product is susceptible to great improvements in tensile strength, modulus characteristics, and stress-strain relationships. Improvements are reflected not only in the above physical measurements but also in the dynamic properties (loss factor and percent relative damping), ozone resistance, electrical resistivity, solution and compatibility with other types of rubbers, resins, solvents, etc., adhesion to tire cord, cloth, metal, paper, etc. and other properties, etc. The attached polar groups also permit a new type of vulcanization or curing not dependent upon, but supplemental to, the ordinary curing with sulfur and accelerators, or dinitrosobenzene or quinone dioxime cure.

Although the mechanism of the chemical reactions involved in the present invention is not known with certainty, it is believed that, under the reaction conditions used, the polyfunctional modifier is attached to the butyl polymer chain without substantial loss of unsaturation.

The importance of using these purification techniques, together with maintaining the modification reaction at a minimum, is best understood by the following examples which serve to illustrate the advantages of the invention.

EXAMPLE 1

Butyl rubber, having a viscosity ML at 212° F. (8 min.) of about 70, composed of about 98 weight percent isobutylene and 2 weight percent isoprene, was dissolved in benzene to make a 10.1 weight percent cement solution. 1415 grams of this solution was reacted with 1.43 grams of para nitrosophenol at 206° F. for one hour. Samples of this solution of modified rubber were then washed with varying amounts of water until a pale yellow color was obtained. The effect of the water/cement ratio on the separation time and water recovery is set forth in Table I.

Table I

| Volume Wash Ratio, Water: Cement | Washes Reqd. to Get Pale Yellow Color | Washing Time, Min. | Separation Time, Min. | Total Time, Min. | Percent Wash Water Recovered After 1 Hr. Total Separation Time | Separation Time for 85% of Water, Min. |
|---|---|---|---|---|---|---|
| 1:1 | 3 | 30 | 30 | 60 | 98.8 | 15 |
| 1:1.5 | 3 | 30 | 60 | 90 | 92.0 | 52.5 |
| 1:2 | 3 | 30 | 60 | 90 | 94.5 | 55.2 |
| 1:2.5 | 3 | 30 | 60 | 90 | 88.9 | 57.1 |
| 1:3 | 3 | 30 | 60 | 90 | 91.2 | 57.5 |
| 1:3.33 | 4 | 40 | 70 | 110 | 85.0 | 60 |
| 1:3.75 | >4 | 40 | 120 | 160 | 85.2 | 60.0 |

The pale yellow color is indicative of a pure product because para nitrosophenol has a deep red color. These data show that three washings are necessary to obtain this color where the ratio of water/cement is from 1:1 to less than 1:1.5. The 1:1 ratio is especially effective because the separation time was unexpectedly short and almost 99% of the water was recovered after only one hour. When large amounts of water were employed the separating time increased sharply and the degree of separation dropped significantly.

EXAMPLE 2

The following experiment shows the effect of agitating the cement while adding the wash water. 350 gallons of a benzene solution of butyl rubber (98 wt. percent isobutylene and 2 wt. percent isoprene), modified with 1 phr. of para nitrosophenol by reacting it at 206° F. for three hours, was washed three times with about 250 gallons of water. In one run the rubber solution was agitated while the water was being added while in the other run it was not. Both solutions were then agitated for 10 minutes and allowed to settle.

Table II

| Agitated While Adding Water | Volume Wash Ratio, Water to Cement | Total Wash Volume, Gal. | Separating Time, Minutes | Percent Wash Water Recovered |
|---|---|---|---|---|
| Yes | 1:1.4 | 250 | 75 | 72 |
| No | 1:1.4 | 250 | immediate | 100 |

The data demonstrate that an infinitely shorter separating time and a better separation is obtained when the butyl rubber solution is quiescent while the wash water is being added. This is an unobvious phenomenon in view of the fact that both mixtures were agitated after the water was introduced.

EXAMPLE 3

Two samples of the same butyl rubber dissolved in benzene were reacted with 1 phr. of para nitrosophenol at 206° F. for different periods of time, namely, 1 hour and 24 hours. Each sample, containing 10 wt. percent modified rubber, was washed once with 500 cc. of water in a ratio of one volume of water to one volume of cement. In the case of the sample reacted for one hour, all of the water used to wash the cement was recovered, while only 93% of the wash water was recovered from the other sample. These data demonstrate that reacting the rubber with the nitroso compound for an excessive length of time results in a product which is more difficut to purify.

It is not intended that the invention be limited to the specific examples herein given for the sake of illustration, but rather it is intended to include all modifications coming within the scope of the invention.

What is claimed is:

1. A method of preparing a modified copolymer which comprises reacting a minor proportion of a mono-nitroso benzene compound containing only hydroxy groups and alkyl groups but not more than 2 said hydroxy groups and 2 said alkyl groups with a major proportion of a copolymer having an iodine number of 0.5 to 50 of a $C_4$ to $C_6$ monoolefin with a $C_4$ to $C_{14}$ multiolefin dissolved in an inert organic solvent, adding 1 volume of water to about 1 to less than 1.5 volumes of the nitroso modified copolymer solution, mixing the resulting combination of water and nitroso modified polymer solution, allowing the mixture to settle and separating the layer of dissolved copolymer from the water.

2. A method according to claim 1 in which the adding, mixing, settling and separating steps are carried out three times using from about 1 to 1.4 volume of nitroso modified copolymer solution.

3. A method according to claim 1 in which the nitroso modified copolymer solution is quiescent when the water is added and the mixture is thereafter agitated.

4. A method according to claim 1 in which the reaction time is between 1 minute and 4 hours.

5. A method of preparing a modified copolymer which comprises reacting about 0.1 to 5 parts by weight of a hydroxy-substituted mono-nitroso benzene compound containing only hydroxy groups and alkyl groups but not more than 2 said hydroxy groups and 2 said alkyl groups with 100 parts by weight of a rubbery copolymer, having an iodine number of 0.5–50 of isobutylene with a $C_4$–$C_6$ conjugated hydrocarbon diolefin, dissolved in about 300 to 600 parts by weight of an inert organic solvent, adding 1 volume of water to about 1 to less than 1.5 volumes of nitroso modified copolymer solution, mixing the resulting combination of water and nitroso modified copolymer solution, allowing the mixture of water and nitroso modified copolymer solution to settle, and separating the layer of dissolved modified copolymer from the water layer, said adding, mixing, settling and separating steps being carried out from 1 to 3 times.

6. A method according to claim 5 in which the reaction temperature is between about 150 and 350° F.

7. A method according to claim 5 in which the nitroso compound is para nitrosophenol.

8. A method according to claim 5 in which 1 volume of nitroso modified copolymer solution is mixed with 1 volume of water.

9. A method according to claim 5 in which the nitroso modified copolymer solution is quiescent when the water is added and the mixture is thereafter agitated.

10. A method according to claim 5 in which the reaction time is about 0.5 to 4 hours.

11. A method according to claim 5 in which the adding, mixing, settling and separating steps are carried out 3 times.

References Cited in the file of this patent

UNITED STATES PATENTS

| | | |
|---|---|---|
| 2,035,698 | Fisher | Mar. 31, 1936 |
| 2,393,321 | Haworth | Jan. 22, 1946 |
| 2,526,504 | Rehner et al. | Oct. 17, 1950 |
| 2,690,780 | Cousins | Oct. 5, 1954 |
| 2,798,860 | Hand et al. | July 9, 1957 |
| 2,895,937 | Baldwin et al. | July 21, 1959 |